CARD READING AND PUNCHING DEVICE FOR DATA PROCESSING MACHINES

Filed Nov. 14, 1960 2 Sheets-Sheet 2

United States Patent Office 3,027,068

Patented Mar. 27, 1962

3,027,068

CARD READING AND PUNCHING DEVICE FOR DATA PROCESSING MACHINES

Rinzo Iwai and Nozomu Yasumatsu, Tokyo, Japan, assignors to Fuji Tsushinki Seizo Kabushiki Kaisha, Kawasaki, Japan, a corporation of Japan

Filed Nov. 14, 1960, Ser. No. 68,757
Claims priority, application Japan Nov. 13, 1959
2 Claims. (Cl. 234—20)

Our invention relates to data processing machines and, in a more particular aspect, to a card reading and punching device for use in such machines.

In data processing equipment operating with cards as data carriers, the cards pass from an input station, such as a stack of cards placed upon a loading surface, along a processing path to an ultimate receiving or lay-off station. The data to be read off the card are sensed by suitable feeler or sensing devices along the just-mentioned travel path, and any data to be newly entered into a card are punched at another location of the same path. In the conventional card reading and punching devices of this kind, all feed rollers are linked together by gears and are jointly driven from a motor through Geneva gears or the like transmissions. The operation of such machines constitutes essentially a repetition of a uniform travelling motion of a card coming from the loading station and ultimately reaching the card receiver or lay-off station. For that reason the feeding travel of the card through the reading and punching device is always in accordance with a more or less rigid and invariable program.

The conventional card processing devices are also subjected to considerable shock and wear due to the fact that all roller pairs are linked together and are jointly accelerated and decelerated by the intermittent drive or by the clutches used for starting and stopping the operation.

It is an object of our invention, relating to card processing devices of the above-mentioned type, to render the operation of the card-feeding roller means that pass the cards to the reading and punching location more versatile with respect to applicable control possibilities.

Another object is to greatly reduce the impact forces and wear imposed upon the feeder mechanism.

To this end, and in accordance with a feature of our invention, we provide each of a large number of feed-roller pairs in a card reading and punching device with its own electric stepping drive, preferably an electromagnetic stepping motor of the rotary type, and we control these electric stepping drives independently of each other in accordance with a desired or selected combination of control programs for the respective roller pairs. According to another, more specific feature, we provide electric pulse supply means for each of the individual roller-pair stepping drives, these pulse supply means comprising a pulse-number control device for turning the stepping motor a given number of angular steps to thereby advance the card a travel distance corresponding to the number of pulses.

The foregoing objects, advantages and features of our invention will be apparent from the following description of the embodiment illustrated by way of example on the accompanying the drawings in which.

Figures 1, 3:
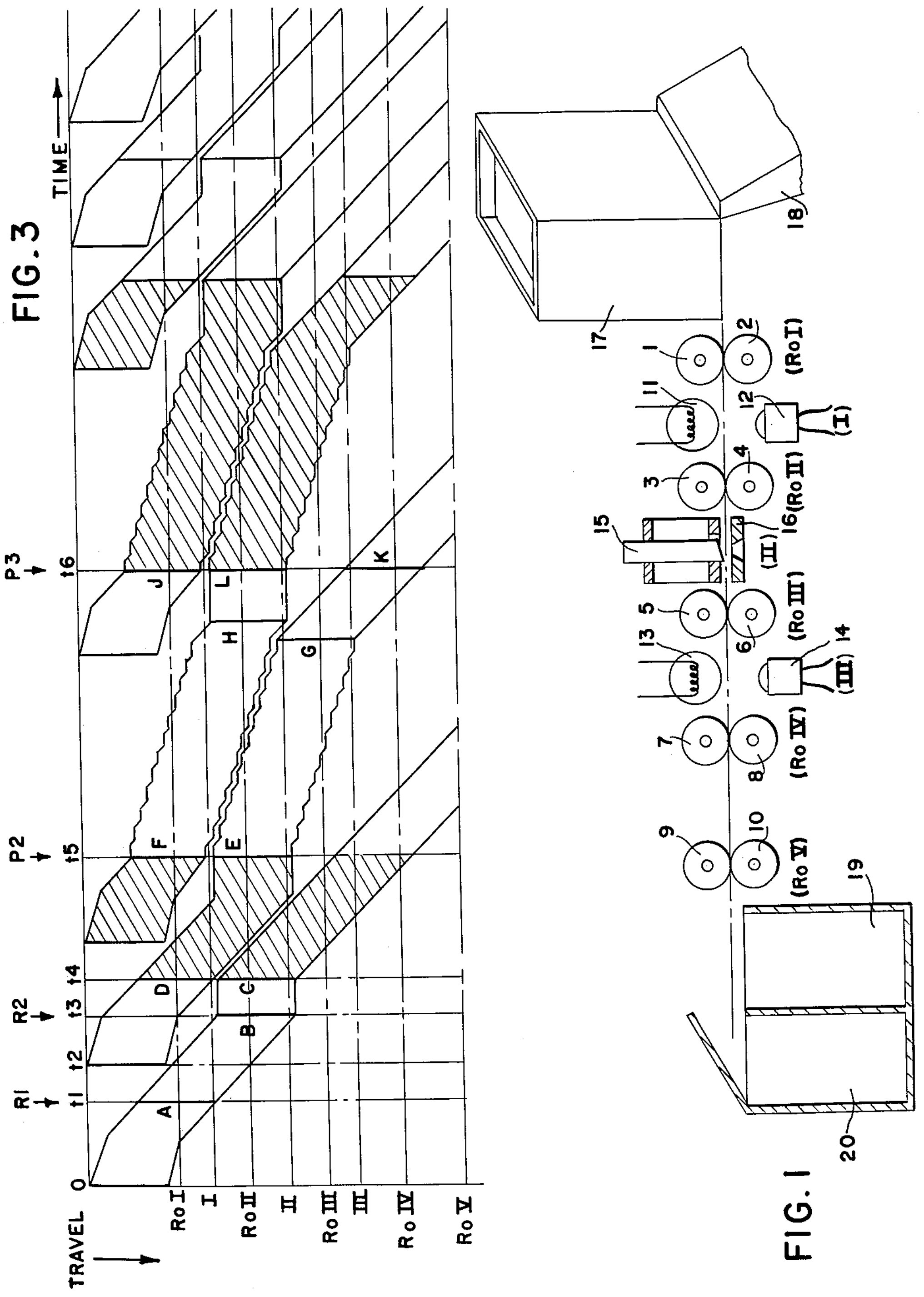
FIG. 1 is a schematic view of a card processing device according to the invention.
FIG. 3 illustrates diagrammatically an example of a control program for the reading and punching devices as well as of the feed rollers in a device according to FIGS. 1 and 2.
Figure 3A:
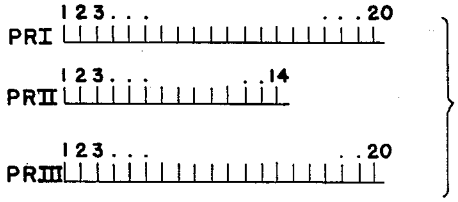
Figure 3B:
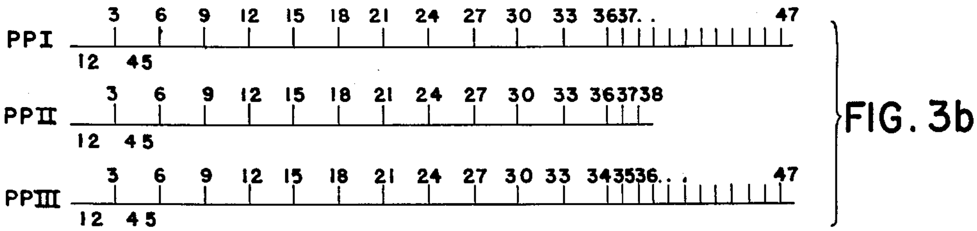

FIGS. 3*a* and 3*b* are explanatory graphs relating to the control program represented in FIG. 3.

Figure 5:
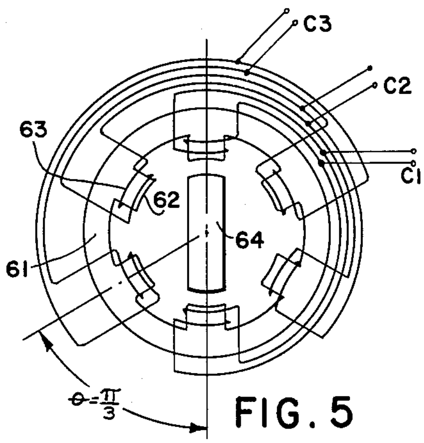
Figure 4:
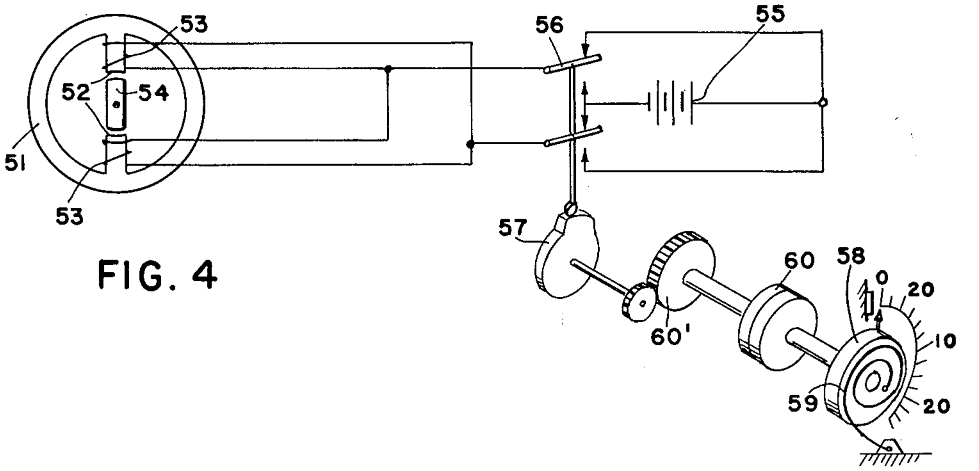

FIG. 4 shows an electric circuit diagram of one of the electromagnetic stepping motors of the device, and FIG. 5 illustrates another form of a stepping motor applicable for the purposes of the invention.

Referring to FIG. 1, the cards piled up in a card box 17 are individually removed from the bottom of the pile by means of a pusher 18 which advances the lowermost card into a card feeder assembly. The feeder assembly passes the cards into a receiver box 19 or 20 by means of five pairs of pinch rollers. The pairs are denoted by R*o*I to R*o*V. Each comprises a pair of rollers 1 and 2, 3 and 4, 5 and 6, 7 and 8, 9 and 10. Fixed along the card travel path, defined by the roller pairs, are a first reading position I where a lamp 11 and a photoelectric cell 12 are mounted in order to read whether the card has a punched hole. It will be understood that, while only one lamp and one photocell are shown, a number of them may be located transversely of the card travel path. Mounted at another fixed location II along the travel path is a punching device comprising a punch 15 and a die 16, and a second reading position III where another lamp 13 and a photoelectric cell 14, or several lamp-cell combinations are located. The second reading serves to check whether the punching at station II was accurate.

Figure 2:
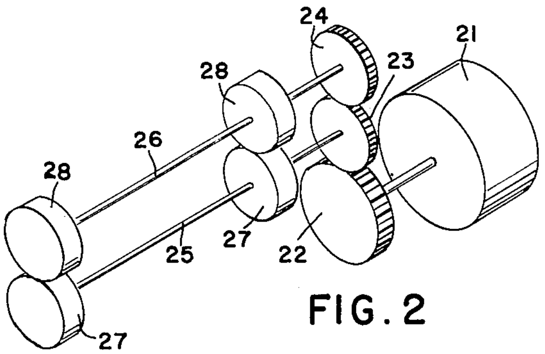
FIG. 2 illustrates in schematic perspective one of the pairs of feed rollers which form part of the device according to FIG. 1.

One pair of the feed rollers shown in FIG. 1 is separately represented in FIG. 2 where these feed rollers are denoted by 27 and 28. In the illustrated embodiment, each feed roller 27 consists of two axially spaced parts mounted on a roller shaft 25. Analogously, the other roller 28 is composed of two axially spaced parts mounted on a roller shaft 26. Both shafts are driven from an electromagnetic stepping motor 21 or the like electric stepping drive whose shaft carries a spur gear 22 meshing with a spur gear 23 on roller shaft 25. Gear 23 is in meshing engagement with another spur gear 24 on shaft 26. The card, on its way from the supply station to the receiver passes between the two pinch rollers 27 and 28.

As shown in FIG. 1, the pairs of feed rollers are spaced from each other a distance approximately equal to the length of the card, so that each card passes from one pair of feed rollers to the next pair which then continues to move it in the forward direction.

Each individual pair of feed rollers has its own stepping motor or stepping drive according to motor 21 in FIG. 2. When an individual signal pulse is supplied to the stepping drive, the feed rollers turn a given angular amount so that the card is advanced a corresponding length of travel. The amount of feed travel therefore can be controlled freely by the number of signal pulses put into the stepping drive. Since the roller pairs are driven independently of one another, the amount of feed motion imparted to the card each time can be varied at will, for example so that a certain pair of rollers will advance the card a given distance while the operation of another roller pair is temporarily discontinued so that the card then within the pinching range of the latter roller pair is stopped.

The time chart illustrated in FIG. 3 represents an example of a reading and punching operation obtainable by such a feed control. In FIG. 3 the abscissa denotes time. The ordinate represents length of card travel. The feed roller positions R*o*I . . . R*o*V, the reading positions I, III and the punching position II, indicated beside the abscissa in FIG. 3, correspond to those shown in FIG. 1.

When the pusher mechanism 18 (FIG. 1) removes the first card from the bottom of the pile, this card is advanced into the first roller pair R*o*I. Before the card reaches the first roller pair, the rotation of this pair is started by issuing signal pulses into its stepping drive so that the card, once caught by the pinch rollers, will continue passing through the first pair RoI. When the forward edge of the card reaches the first reading position I in front of the photoelectric cell 12, the rotation of the first roller pair RoI is stopped by discontinuing the issuance of signal pulses into the stepping drive, and the card is thereafter detained in this position, corresponding to stage A in the diagram of FIG. 3.

It will be understood that the just-mentioned operation can be obtained by any one of the ways and means conventional for control engineering purposes. For example, when the pusher 18 is being actuated, an electric pulse transmitter may be simultaneously connected by closing of a switch with the stepping drive 21 of roller pair RoI, and as soon as the edge of the card enters into the light beam of lamp 11 and darkens the photoelectric cell 12, a relay in the signal transmitter circuit may be actuated to disconnect the transmitter from the drive.

When the card is in the position A (FIG. 3), and upon reading instructions $R_1$ (FIG. 3) coming from a control device such as a computer, a given number of signal pulses, according to a predetermined program are issued in the desired timing sequence to the various roller pairs. For example, according to the timing diagram in FIG. 3*a*, a number of pulses PRI (for example 20 pulses) are sent in equal intervals to the stepping drive for the first roller RoI from the moment $t_1$ (FIG. 3) to the moment $t_4$; a number, for example 14 pulses PRII (FIG. 3*a*), are sent to the drive of the second roller pair RoII from the moment $t_1$ to the moment $t_3$ (FIG. 3), and a number of pulses PRIII (FIG. 3*a*), for example 20 pulses, are sent to the drive of the third roller pair RoIII from the moment $t_1$ to the moment $t_4$ (FIG. 3). In accordance with the same program (FIG. 3), the current supply mechanism, i.e. the pusher 18, is caused to operate at the moment $t_2$. As a result, the first and second pair of rollers RoI and RoII move the card which was previously detained in the A position, to the position B at the moment $t_3$. In this position the card is in proper relation to the punch 15. Thereafter the card stays at position B up to the moment $t_4$. At the same time the second card starts moving at moment $t_2$ and is forwarded to position D at moment $t_4$ where it is detained in the same way and for the same length of time as the above-mentioned first card was detained in position A.

This completes the operations of reading the contents of the first card at the first reading position I and bringing the second card to a point just ahead of the first reading position. In the same way, upon receipt of the instruction to read the second card, the same pulse signals as mentioned above are put into all roller drives. As a result, the first card is now carried to the card receiver by the third, fourth and fifth roller pairs RoIII, RoIV and RoV. Also, the second card is read, while the third card is brought to the position preparatory for subsequent reading.

With this control program, the fourth roller pair RoIV and the fifth roller pair RoV are kept rotating continuously until the time point $t_5$ is reached.

Repetition of the above-mentioned performance permits operating the device simply as a card reading device, the time required for reading a card being between the time points $t_4$ and $t_5$ in the diagram of FIG. 3.

Described presently is the control performance required if the same device is to be operated as a card reading and punching machine, for example when a computation is to be made by putting into a computer or other business machine the information obtained by reading the contents of a certain card at the first reading position I, and thereafter again punching this card in accordance with the result of the computation.

Let us again direct attention to the time point $t_5$ indicated in FIG. 3 at which the processing of the first card is already completed. The second card, at this stage, has had its contents read and is located at position II where the card will be punched. The third card is at the position preparatory for subsequent reading. Under these conditions the combination of signal pulses represented at PPI, PPII and PPIII in FIG. 3*b* are put into the stepping drives for the feed roller pairs RoI, RoII and RoIII respectively. That is, the stepping drive of the first roller pair RoI, for example, receives one signal during an interval of time three times as long as the duration of a signal to be put into the drive upon receipt of the above-mentioned reading instructions (see FIG. 3*a*). After repeating this procedure twelve times, eleven signals are supplied one after another in equal intervals. The other roller drives are likewise supplied with signals as represented in FIG. 3*b*. As a result, the second card, according to FIG. 3, reaches the card receiver from position E through positions G and K; the third card passes from position F through position H to position L; and the fourth card reaches the position J from the card loading station.

After the second card reaches the punching position II it remains there temporarily and is punched by the punch 15 and the die 16 as shown in FIG. 1. The third card completely passes beyond the first reading position I when it travels from F to H so that the information on the card is read out at this time. The fourth card is now completely prepared for the next reading. According to FIG. 3, the third card is at rest between the moments corresponding to H and L. This is because at that time the memorizing device, such as the computer of the business machine, which touched off the punching operation, is still in operation since the second card, at this time, has not yet completely passed by the second reading position III where the previously punched information is checked. Consequently the next following punching operation cannot yet be started even though the information-reading operation for the third card was completed at stage H. Therefore, in order to increase the operating speed of the computer, it is desirable to have the second card move from G to K as promptly as possible. To do this, the second card may be made to repeat the two operations of "rest and punch" and "feed" from E to F, or the operation for the second card can be switched to continuous feeding from stage G, by correspondingly imposing a rapid control or signal sequence upon the roller drive. At this time the third card is resting from H to L, while the fourth card is being carried from the card loading station to the point just ahead of the first reading position I.

It will be realized from the above-mentioned example of operation that by virtue of the independent stepping drives for the feed rollers according to the invention, a great versatility and virtually unrestricted variety of control is afforded.

By repeating the above-mentioned performance, the above-described device embodying the present invention can be operated as a reading-punching device at such a speed that the reading and punching of one card requires a time equivalent to the interval between moments $t_5$ and $t_6$.

Electromagnetic stepping motors suitable for the purposes of the above-described invention are known as such, as well as suitable pulse transmitting and control systems for operating such motors to rotate a desired angular amount. Examples of such motors are illustrated in FIGS. 4 and 5.

According to FIG. 4 the rotary stepping motor has a ring-shaped stator 51 of iron with two salient poles 52 which are provided with respective stator windings 53. The rotor 54 also consists of iron. Stator and rotor may be formed of the usual laminations, neither of them including a permanent magnet. When current is passed through the stator windings 53, the rotor poles are attracted so that the rotor assumes the illustrated position in alignment with the axis of the stator poles, and the rotor is thereafter magnetically locked in this position until the current is cut off.

In the embodiment of FIG. 5, the stator 61 is provided with three pairs of salient poles such as the one denoted by 62 and each pole carries a field winding such as the one denoted by 63. The windings are connected to three pairs of current supply terminals C1, C2 and C3, each two opposite field windings being interconnected in parallel relation. In such a motor, the rotor 64 is sequentially attracted to the pole pairs when the stator field windings are excited sequentially in a given order, and each time the motor is kept arrested in locked-rotor condition until the current is switched over to the next following pair of windings.

In the embodiment according to FIG. 4, the rotor 54 is rotated stepwise by alternately reversing the polarity of the excitation current supplied to the stator field windings 53. While this is preferably done by connecting the windings to an electronic pulse generator issuing alternating positive and negative pulses, it is preferred to exemplify in FIG. 4 a mechanical pulse control system, generally of the telephone-dial type, because it can be more simply illustrated and more readily understood, and because the particular pulse generating and pulse controlling means are not relevant to the invention proper.

As shown in FIG. 4, the stator windings 53 are connected to a current source 55 by means of a polarity reversing switch 56 under control by a cam 57. For the purpose of explanation it is assumed that a control disc 58 can be set from a zero position to a position corresponding to the number of pulses to be issued to the stepping motor, this number of pulses being shown indicated by a scale of indicia, although in a data processing machine the disc 58 is preferably motor-driven to the proper setting under control by a programmer which also controls the setting of the pulse generating device appertaining to the respective other roller-pair stepping drives as well as the operation of the puncher and read-out devices. When the disc 58, after being set in the above-described manner, is released, it returns back to the zero position at a given speed under the force of a spring 59, thereby entraining the cam 57 through a free-wheeling clutch 60 which transmits motion to the cam 57 only when the disc 59 rotates counterclockwise. As a result, the cam 57, driven from clutch 60 through a step-up gearing 60′, operates the switch 56 a corresponding number of times thus issuing the adjusted number of switching pulses to the stepping motor.

The stepping motor as preferred for the purposes of our invention and as shown in FIGS. 4 and 5 is characterized by the fact that neither the stator nor the rotor include a permanent magnet. It should be understood, however, that the excitation windings need not necessarily be mounted on the stator but may also be placed on the rotor or on both components of the motor. The operation of the motor is distinctive in that the rotor advances intermittently, step by step, and is each time constrained to remain in the proper step position, thus differing from a synchronous or other motor of continuous rotation. For that reason such a stepping motor is particularly well suitable for numerical control purposes as involved in the present invention.

It will be recognized from the foregoing that the illustrated embodiment of a card processing device according to the invention affords a versatile way of selective operation so that it can be used either for reading and punching operation or also exclusively for punching operation at a higher processing speed than otherwise applicable to the cards.

Since the stepping motors or similar electric stepping drives can be started and stopped rapidly and reliably, the feeding and stopping of the cards is effected with similar rapidity and reliability. It is also an advantage that by virtue of the invention no heavy parts such as clutches or Geneva gear wheels are called upon to perform a discontinuous operation so that the device is capable of accurate operation for long periods of time without the danger of being subjected to excessive stress or breakdown.

We claim:

1. A card reading and punching device for data processing, comprising a card conveying assembly having a plurality of feed roller pairs engageable with a card and defining together a card travel path, card processing means located along said path for coaction with a card when the latter is at the location of said processing means, each of said feed roller pairs having an electric stepping drive, and electric pulse supply means connected to said stepping drive and having pulse number control means for running said drive a rotational amount to thereby advance the card a given travel distance depending upon the number of pulses.

2. A card reading and punching device for data processing, comprising a card conveying assembly having a plurality of feed roller pairs engageable with a card and defining together a card travel path, card reading means and card punching means located along said path in spaced relation to each other with at least one of said feed roller pairs disposed between said respective means, each of said feed roller pairs having an electromagnetic rotary stepping motor, and independently operable electric pulse supply means connected to said respective stepping motors and having respective pulse number control means for turning said motor a given number of steps to thereby advance the card a travel distance corresponding to the number of pulses.

References Cited in the file of this patent

UNITED STATES PATENTS

| | | |
|---|---|---|
| 2,394,604 | Ford | Feb. 12, 1946 |
| 2,661,685 | Keen | Dec. 8, 1953 |
| 2,751,982 | Schlemmer | June 26, 1956 |